United States Patent [19]
Hawkins et al.

[11] Patent Number: 6,056,533
[45] Date of Patent: May 2, 2000

[54] APPARATUS FOR CONDUIT EXTRUSION

[75] Inventors: Thomas W. Hawkins, Aurora; Michael S. Schafer, Macedonia; Jesse D. Ellison, Sr., Garretsville, all of Ohio

[73] Assignee: The Lamson & Sessions Co., Cleveland, Ohio

[21] Appl. No.: 09/044,535

[22] Filed: Mar. 19, 1998

[51] Int. Cl.[7] .................................................. B29C 47/24
[52] U.S. Cl. .................. 425/380; 425/133.1; 425/382.3; 264/171.29; 264/209.8
[58] Field of Search ............................ 425/382.3, 131.1, 425/133.1, 380; 264/209.8, 121.13, 121.29, 123.12, 173.16, 177.17

[56] References Cited

U.S. PATENT DOCUMENTS

| | | | |
|---|---|---|---|
| 3,520,966 | 7/1970 | Soffiantini | 264/171.29 |
| 3,642,396 | 2/1972 | Meneidis | 425/133.1 |
| 3,647,612 | 3/1972 | Schrenk et al. | 428/213 |
| 3,784,339 | 1/1974 | Springfiield | 425/133.1 |
| 4,292,014 | 9/1981 | Lupke et al. | 425/72.1 |
| 4,686,075 | 8/1987 | Dziewanowski et al. | 264/209.2 |
| 4,798,696 | 1/1989 | Boen Per | 264/209.2 |
| 5,017,117 | 5/1991 | Iacconi | 425/133.1 |
| 5,051,081 | 9/1991 | Kammori | 425/131.1 |
| 5,059,375 | 10/1991 | Lindsay | 264/167 |
| 5,217,723 | 6/1993 | Tsingopoulos | 425/113 |
| 5,464,340 | 11/1995 | Yano | 425/382.3 |
| 5,518,749 | 5/1996 | Weinstein | 426/500 |
| 5,670,185 | 9/1997 | Heck et al. | 425/133.1 |
| 5,834,034 | 11/1998 | Nakazaki et al. | 425/113 |

*Primary Examiner*—Jan H. Silbaugh
*Assistant Examiner*—Stefan Staicovici
*Attorney, Agent, or Firm*—Jones, Day, Reavis & Pogue

[57] ABSTRACT

An extrusion assembly includes a stationary housing section, and an outer die and mandrel for defining an annular passageway centered about an axis. The outer die and mandrel are held stationary against rotational motion about the axis. A rotor is rotationally supported on a shaft projecting into the annular passageway along the axis within the housing, for rotational motion about the axis. The rotor includes a melt channel for rotationally conveying an extrusion to the annular passageway, so as to form a helically-wound conduit that advances linearly through the annular passageway. A gear train is operative between the stationary housing, the rotor and the shaft, to hold the shaft stationary relative to the stationary housing upon rotation of the rotor.

2 Claims, 2 Drawing Sheets

APPARATUS FOR CONDUIT EXTRUSION

BACKGROUND OF THE INVENTION

The present invention pertains to the field of conduit extrusion, particularly for the manufacture of flexible, liquid-tight conduit of the type used in electrical applications, e.g. between junctions and other such components. In a conventional manufacturing process, it is typical to manufacture conduit by coextruding flexible and rigid PVC and wrapping the coextrusion around a winding mandrel. As the winding mandrel rotates, the coextrusion advances therealong to produce a helically wound conduit.

The flexible PVC is molten upon extrusion, and so the adjacent edges of the helically-wound conduit become self-welded to produce a continuous tube with a helical seam. This seam is a region of mechanical weakness, and it is common for the weld to fail along the seam, causing the conduit to "unwrap." The strength of the weld is very sensitive to the grade of PVC material used, and the best results are only obtained by using very high-quality material which contributes significantly to the cost of the product.

During the extrusion step of this process, the extrusion head remains stationary and the conduit rotates along with the winding mandrel. A rotating conduit is not easily coiled or otherwise accumulated, since such would twist the conduit. Thus, the final length of the conduit is limited to what can be taken straight off the mandrel, placing an undesirable length restriction on the conduit product.

In an alternative previous process, a stationary calibration rod is used with a rotating extruder head, which rotates to deposit the extrusion on the stationary calibration rod. The calibration rod assembly is hollow and includes a plurality of "tapes," i.e. continuous belts configured around the peripheral exterior of the calibration rod. The belts are threaded longitudinally from the inside around to the outside. The belts are pulled by a conventional haul-off arrangement as the extrusion is applied, which longitudinally advances the conduit, resulting in a helical winding. In this way, a continuous conduit can be made having no particular limitation on length.

However, with this method, there are small gaps between adjacent belts, and these gaps produce small interior notches on the inner wall of the conduit. These notches represent lines of weakness, along which the conduits can fail. Also, during manufacture, the tapes wear out very quickly, and break after only a few hours of use, thus requiring continuous intervals of maintenance and costly down-time.

Flexible electrical conduit must conform with the standards prescribed by Underwriters Laboratories in UL 1660. As indicated in Section 10 of UL 1660, conduit must pass a tension test in which a 300 lb. weight hangs from the end of a 44 inch length of conduit for a 60 second period without opening or uncoiling. Such conduit must also withstand an impact test, in which a weight is dropped on the conduit, which must resist breaking. The UL has recently harmonized standards with those of the Canadian Standards Association (CSA 22.2). All electrical conduit must now satisfy a cold weather impact test in which nine ft. lbs. of energy is impacted to a six inch length of conduit at a temperature of −18° C. (For example, a 9 lb. weight dropped from a height of one ft., etc.) The conduit made by the previous processes broke along the notches or weld seams and therefore failed the test.

BRIEF DESCRIPTION OF THE INVENTION

In view of the above-indicated drawbacks and deficiencies associated with the previous systems, there is therefore a need for a conduit without mechanically-weak seams.

There is also a need for a conduit without welded seams.

There is also a need for a conduit that can be manufactured without material sensitivity.

There is also a need for a conduit-making process that is more "robust," requiring less maintenance and down-time.

There is also a need for a conduit that can withstand cold weather impact requirements.

These needs and others are satisfied by the present invention in which an extrusion assembly is disclosed having a stationary housing section and an outer die and mandrel for defining an annular passageway centered about an axis. The outer die and mandrel are held stationary against rotational motion about said axis. A rotor is rotationally supported within said housing, for rotational motion about said axis. The rotor includes a melt channel for rotationally conveying an extrusion to the annular passageway, so as to form a helically-wound conduit that advances linearly through the annular passageway.

The above and other needs which are satisfied by the present invention will become apparent from consideration of the following detailed description of the invention as is particularly illustrated in the accompanying drawings.

DETAILED DESCRIPTION OF THE INVENTION

Figure 1:
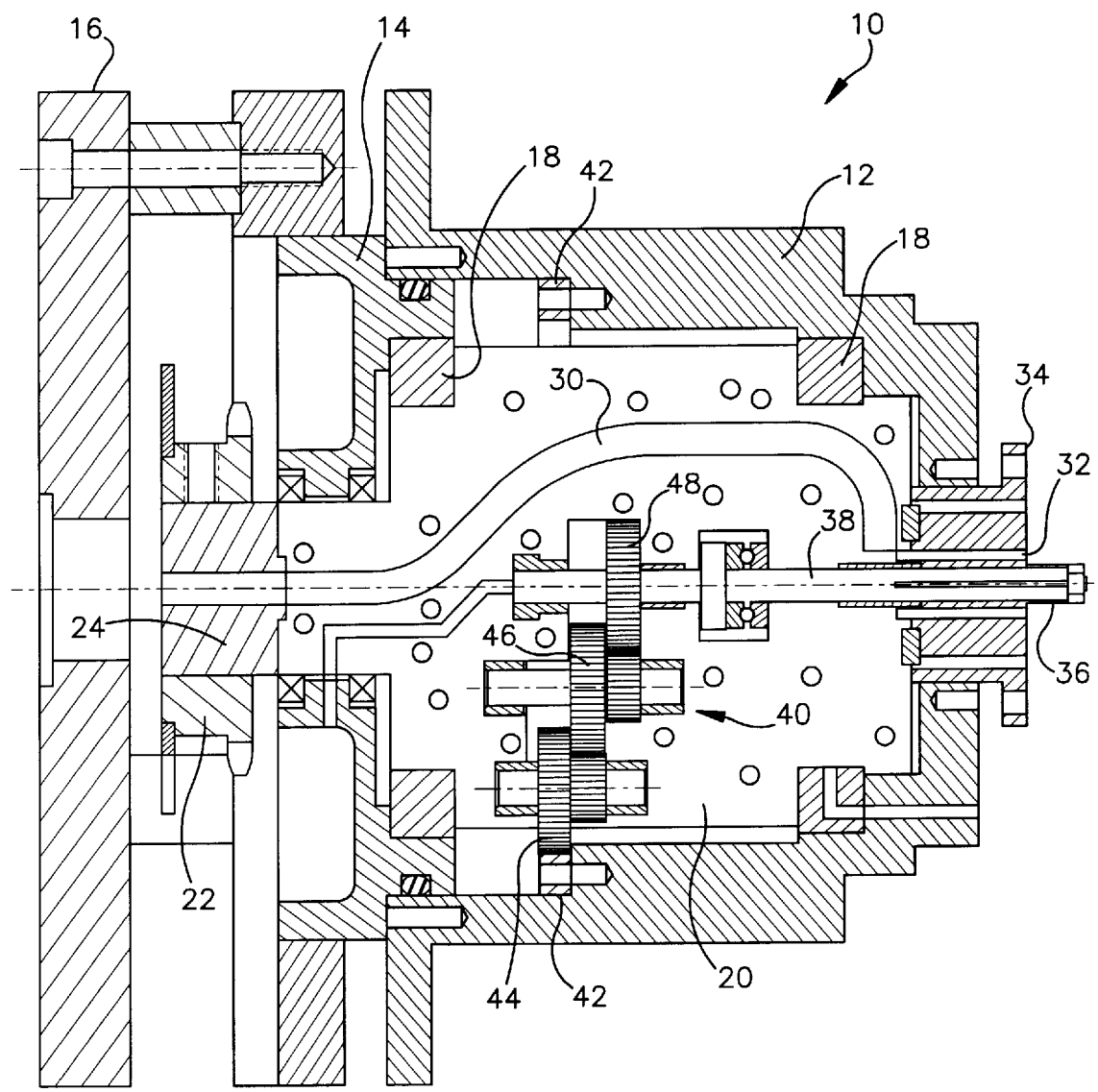
FIG. 1 is a side-sectional view showing the extrusion assembly of the present invention.

FIG. 1 shows an extrusion head assembly 10 as according to the present invention. The head assembly includes a stationary housing 12 which is sealed with a housing cap 14 and mounted to two extruders (not shown) by a mounting plate 16. A pair of bushings 18, preferably bronze, are retained within the housing 12 to support a rotor 20, which is rotated by a drive force applied to a drive sprocket 22.

The conduit formed by the present invention is formed of a coextrusion of flexible PVC (polyvinyl chloride) and an internal coil of rigid PVC, non-flammable materials commonly used for electrical applications. The coextruded materials are injected from the external extruder through a head bushing 24 and into a melt channel 30 formed within the rotor 20. The melt channel 30 conveys the coextruded materials to an annular passageway 32, defined by the space between an outer die 34, mounted to the housing 12, and a mandrel 36, which is held stationary along a central shaft 38 that defines the axis of rotation of the rotor 20.

In the preferred embodiment, the central shaft 38 is retained within a bushing in the rotor 20 and is not fixedly mounted to a stationary structure. However, the shaft 38 and the mandrel 36 are held stationary against rotation through a gear train 40. The stationary housing 12 includes a planetary gear 42, which is mounted along the inside of the housing 12. The gear train 40 is retained within the rotor 20 and rides along the planetary gear 42 upon rotation of the rotor 20. In one exemplary embodiment, the planetary gear 42 is six inches in diameter. As shown in the illustrated embodiment, the gear train includes a first reducer 44, which is a large gear (preferably 1-½ inch, 30 tooth) joined with a small gear (¾ of an inch, 15 tooth) so that the first reducer 44 turns four times for each turn of the rotor 20. The small gear mates with the large gear of a second reducer 46, identical to the first reducer 44, to provide a 2:1 gear ratio, so that the second reducer turns twice for each turn of the rotor 20. The small gear of the second reducer mates with a 1-½ inch, 30 tooth shaft gear 48 fixed to the central shaft 38, also providing a 2:1 ratio so that the shaft gear 48 does not rotate, but remains stationary with respect to the rotor 20 while it turns, thus holding the mandrel 36 stationary against rotation. However, it will be appreciated that other such embodiments of the gear train can be realized without departing from the invention.

Figure 2:
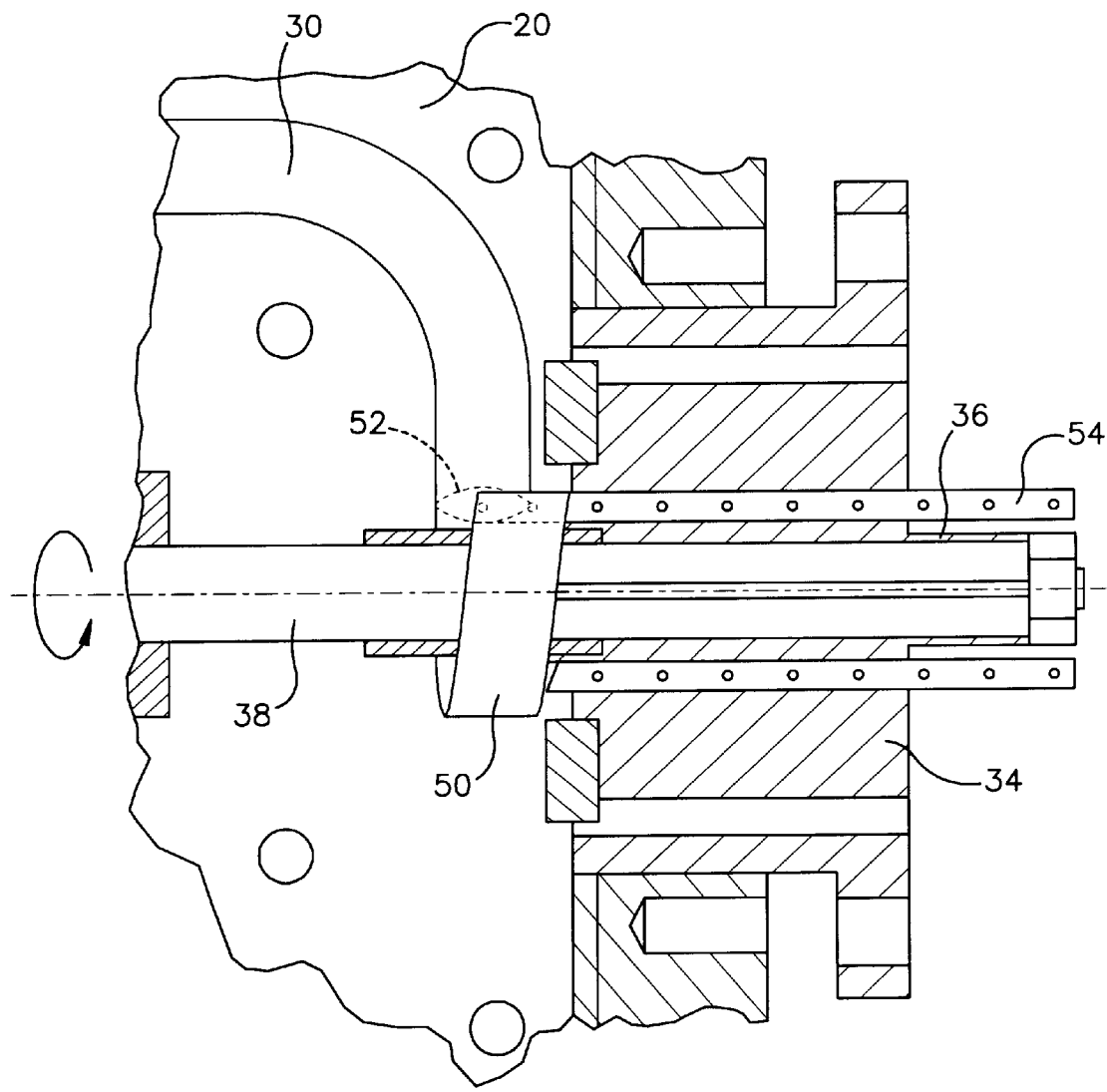
FIG. 2 is a detail view of the outer die and mandrel assembly of the present invention.

The method of making liquid-tight, flexible conduit will now be discussed, making particular reference to FIG. 2, which shows the detail of the outer die 34 and mandrel 36 assembly of the present apparatus. A coextrusion 50 of flexible vinyl with a core of rigid vinyl is introduced into the melt channel 30, and passes through the rotor 20 to exit at a helical orifice 52 that substantially abuts the annular passageway 32. The helical orifice 52 preferably wraps about one full turn around the mandrel 36 and has a pitch of about 15 degrees, so as to give the helical winding of the conduit a start.

The rotor 20 is rotated about the axis while the coextrusion 50 is injected into the annular passageway 32 with a predetermined extrusion force, resulting in a helically-coiled extrusion 50 deposited into the annular passageway 32. The flexible vinyl material is molten during this stage, and is forced against the adjacent edges of the previous-deposited coil, so as to fuse the adjacent coils into a continuous matrix, to form a helically-wound conduit 54. Since the extrusion is rotationally deposited into the stationary passageway 32, the resulting conduit 54 does not rotate as it advances out of the passageway 32. Rather, the conduit 54 linearly advances out of the passageway 32 under the extrusion force and the speed of rotation of the rotor 20. Upon exiting the passageway 32, the conduit is preferably vacuum-sized to a desired outer diameter, such as is known in the art. The conduit is preferably pulled out of the passageway 32 using a conventional haul-off arrangement, such as is also known in the art.

The inventors have observed that the pitch of the helical extrusion winding is dependent on the extrusion force and the speed of rotor rotation. Under constant force, it is observed that the pitch of the winding is greater under fast rotation and lesser under slow rotation. Since the extrusion is forced into a confined channel, the material flows together without any gaps, eliminating the seam resulting from the weld of previous processes. The inventors have observed that under sufficiently high speed rotation, all evidence of a helical winding disappears and the resulting conduit appears to be solid-wall.

Unlike previous processes, the present invention integrates the concepts of extrusion and conduit-forming into the extrusion head, so that a finished conduit exits the head. Since there is no rotation of the conduit during manufacture, finished conduit of infinite length can be produced, avoiding the length limitations of previous processes and apparatuses.

In addition to the above, the present process is considered more "robust." The present process can produce conduit indefinitely without interruption, and thus does not require the high maintenance and lengthy periods of down-time known from previous processes. Since the number of process steps are reduced, the present invention produces more product per unit time, thus improving efficiency.

Since the present outer jacket is continuous, not welded, as in the previous processes, the product made by the present process is insensitive to the types of materials used. Thus, high strength and higher cost materials are not necessary to produce a high quality product. In fact, even recycled material can be used, resulting in a considerable material savings. Also, since no weld is produced, the normal sites of failure for this product are eliminated.

In addition to the above, the apparatus of the present system is only ½ as expensive as the previous apparatus. Thus, it is less expensive for the front end consumer to purchase the present apparatus, resulting in even further savings.

The foregoing description of the preferred embodiment has been presented for purposes of illustration and description. It is not intended to be limiting insofar as to exclude other modifications and variations such as would occur to those skilled in the art. Any modifications such as would occur to those skilled in the art in view of the above teachings are contemplated as being within the scope of the invention as defined by the appended claims.

We claim:

1. An extrusion assembly comprising:

a stationary housing;

an outer die and mandrel defining an annular passageway centered about an axis, wherein said outer die and mandrel are held stationary against rotational motion about said axis;

a rotor rotationally supported within said housing, for rotational motion about said axis, said rotor including a melt channel for rotationally conveying an extrusion to the annular passageway, so as to form a helically wound conduit that advances linearly through the annular passageway;

a central shaft defining said axis, wherein said rotor rotates about said central shaft;

said central shaft being held stationary and said rotor rotates about said central shaft through a gear train;

said gear train including a planetary gear mounted on said stationary housing, and wherein the gear train further includes a reduction gear assembly that rotates around said central shaft to hold it stationary.

2. An extrusion assembly comprising:

a stationary housing having an outlet structure defining an annular passageway centered on an axis;

a shaft projecting into said annular passageway along said axis;

a rotor supported on said shaft within said stationary housing for rotation about said axis relative to said shaft and said stationary housing, said rotor including a melt channel for rotationally conveying an extrusion to said annular passageway so as to form a helically-wound conduit that advances linearly through said annular passageway; and a gear train operative between said stationary housing, said rotor, and said shaft to hold said shaft stationary relative to said stationary housing upon said rotation of said rotor.

\* \* \* \* \*